(12) United States Patent
Black et al.

(10) Patent No.: US 8,862,416 B2
(45) Date of Patent: Oct. 14, 2014

(54) METHOD AND DEVICE FOR IMPROVING BATTERY LIFE OF A MOBILE COMPUTING DEVICE

(75) Inventors: Gregory R. Black, Vernon Hills, IL (US); Mark J. Carlson, Round Lake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 421 days.

(21) Appl. No.: 12/430,445

(22) Filed: Apr. 27, 2009

(65) Prior Publication Data
US 2010/0274507 A1   Oct. 28, 2010

(51) Int. Cl.
| G01R 31/36 | (2006.01) |
| G06F 9/45 | (2006.01) |
| G06F 11/30 | (2006.01) |
| H04W 36/38 | (2009.01) |
| G06F 1/32 | (2006.01) |
| H04W 52/02 | (2009.01) |

(52) U.S. Cl.
CPC ........... *H04W 36/385* (2013.01); *G06F 8/4432* (2013.01); *G06F 11/3062* (2013.01); *G06F 11/3017* (2013.01); *Y02B 60/50* (2013.01); *G06F 1/3203* (2013.01); *H04W 52/0261* (2013.01)
USPC .................... 702/63; 702/60; 702/61; 702/64

(58) Field of Classification Search
USPC ......................................... 702/60, 61, 63, 64
See application file for complete search history.

(56) References Cited

U.S. PATENT DOCUMENTS

| 6,239,729 | B1 * | 5/2001 | Takeuchi ....................... 341/100 |
| 7,054,399 | B1 * | 5/2006 | Hildebran et al. ............. 375/355 |
| 7,554,441 | B2 * | 6/2009 | Viegers et al. ............ 340/539.22 |
| 2002/0046299 | A1 * | 4/2002 | Lefeber et al. ................. 709/318 |
| 2003/0103026 | A1 * | 6/2003 | Yamakawa et al. .............. 345/87 |
| 2003/0191976 | A1 * | 10/2003 | Cyran et al. .................... 713/340 |
| 2003/0217181 | A1 * | 11/2003 | Kiiskinen ....................... 709/248 |
| 2004/0025067 | A1 * | 2/2004 | Gary et al. ..................... 713/300 |
| 2006/0194549 | A1 | 8/2006 | Janik et al. |
| 2008/0004063 | A1 | 1/2008 | Haapoja et al. |
| 2008/0049714 | A1 * | 2/2008 | Commarford et al. ......... 370/350 |
| 2008/0165714 | A1 | 7/2008 | Dettinger et al. |
| 2009/0061925 | A1 * | 3/2009 | Finkelstein et al. ........ 455/552.1 |
| 2009/0164810 | A1 * | 6/2009 | Kyro et al. ..................... 713/310 |
| 2010/0050180 | A1 * | 2/2010 | Amsterdam et al. ........... 718/104 |
| 2010/0115048 | A1 * | 5/2010 | Scahill ........................... 709/213 |

OTHER PUBLICATIONS

Petit, Sebastian: "The International Search Report and The Written Opinion of the International Searching Authority", European Patent Office, Rijswijk, completed: Jul. 15, 2010, mailed: Jul. 26, 2010, all pages.

* cited by examiner

*Primary Examiner* — Sujoy Kundu
*Assistant Examiner* — Paul D Lee
(74) *Attorney, Agent, or Firm* — Morris & Kamlay LLP

(57) ABSTRACT

A method and device for extending the useful life of an energy storage device, for a mobile computing device is described. The method (150) can include the steps of: running (155) a first application in synchronous communication with a first application server; detecting (160) energy expenditure while running the first application; and synchronizing (165) a subsequent application based on the detected energy expenditure, by: continuing to communicate with the subsequent application if the detected energy expenditure is below a threshold, and discontinuing communication if the detected energy expenditure is above a threshold. Advantageously, this method can provide substantial energy savings in mobile computing device applications.

20 Claims, 7 Drawing Sheets

METHOD AND DEVICE FOR IMPROVING BATTERY LIFE OF A MOBILE COMPUTING DEVICE

FIELD OF THE INVENTION

The field of the invention relates to mobile computing devices and the energy storage device for mobile computing devices.

BACKGROUND OF THE INVENTION

Mobile computing devices, such as mobile or wireless stations, cellphones, radios, laptops, wireless communication devices and the like, operate with a power storage device with a limited energy supply, such as a battery, fuel cell or the like. A mobile computing device needs a power source and, in many cases, this power source is a battery. For instance, cellular phones use various types of batteries to operate. The amount of time a mobile station can typically operate before the energy of the battery is consumed (which is often referred to as "battery life"), is often an important criteria that consumers use in choosing one brand or type of mobile computing device over another brand. The terms battery, energy storage device and power storage device are used interchangeably herein.

While the power storage device is generally rechargeable, it may not be convenient or even possible for a user to recharge. Accordingly, there is a need to maximize the useful operational time of a wireless computing device.

Additionally, different operating environments can cause the user to be surprised and/or frustrated when the battery runs out much more quickly than would typically be expected by the user. Thus, a variation or unexpected short battery life is very undesirable from a user perspective.

This is a particularly relevant problem for mobile computing devices running applications supported by an applications server because of the power drain due to the wireless data exchange between the mobile device and the server, since each upload or download causes the consumption of energy in the mobile device and server. The problem is especially acute in the mobile device, which is typically battery powered and has finite energy available. For example, a mobile device may employ an email server for uploading and downloading email in support of an email application, a contact server for uploading and downloading contact status in support of a social networking application, an information server for downloading movies, news, music, etc. in support of a media playing application, and a back-up/storage server for uploading mobile device data in support of a data back-up application. Typically, the mobile device and application server synchronize on a regular or periodic basis, i.e. they communicate, upload, download or exchange information at essentially regular or fixed time intervals, and in this document, the exchange of data between and mobile device running an application and an application server is referred to as "synchronization", and the amount of time between data exchanges is referred to as the "synchronization interval" or "sync interval", for a given application and application server. Thus, there is a need for increasing a length of a synchronization interval, in order to conserve energy in a power storage device of a wireless computing device, such as a mobile station, in order to prolong useful power storage device or battery life.

Generally, there is a tradeoff between good application performance which requires more frequent data exchanges, i.e. a short synchronization interval, and good battery life which requires less frequent data exchanges, i.e. a long synchronization interval. For example, performance of an email application may be determined by the amount of time it takes to receive an email, and performance of a social networking application may be determined by the delay in receiving a change in a social contact's status.

It is known to vary the synchronization interval according to a schedule, such that the period between downloading increases when certain applications are less likely to require frequent downloads. However, the power drain due to the wireless data exchange with the application server is variable. The available wireless networks may be such that only data transmission methods requiring high power consumption are available. For example, network conditions may be such that the mobile device transmitter may operate at a high power level, or the mobile device receiver may operate with a high level of bit errors resulting in retransmission. The available networks or network conditions may be varying with time due to device mobility into and out of network coverage. Even when the device is not in motion, variable network conditions such as network traffic level, network interference, and channel fading can cause power drain due to the wireless data exchange to vary with time. Hence, the optimum download period cannot always be predicted and scheduled.

Thus, there is a need to provide a longer downloading synchronization interval or period for drawing less energy consumption when the energy required for synchronization is higher, while also providing shorter downloading synchronization interval when the energy required for synchronization is lower, thereby taking advantage of favorable network conditions which may be temporary.

Figure 1:
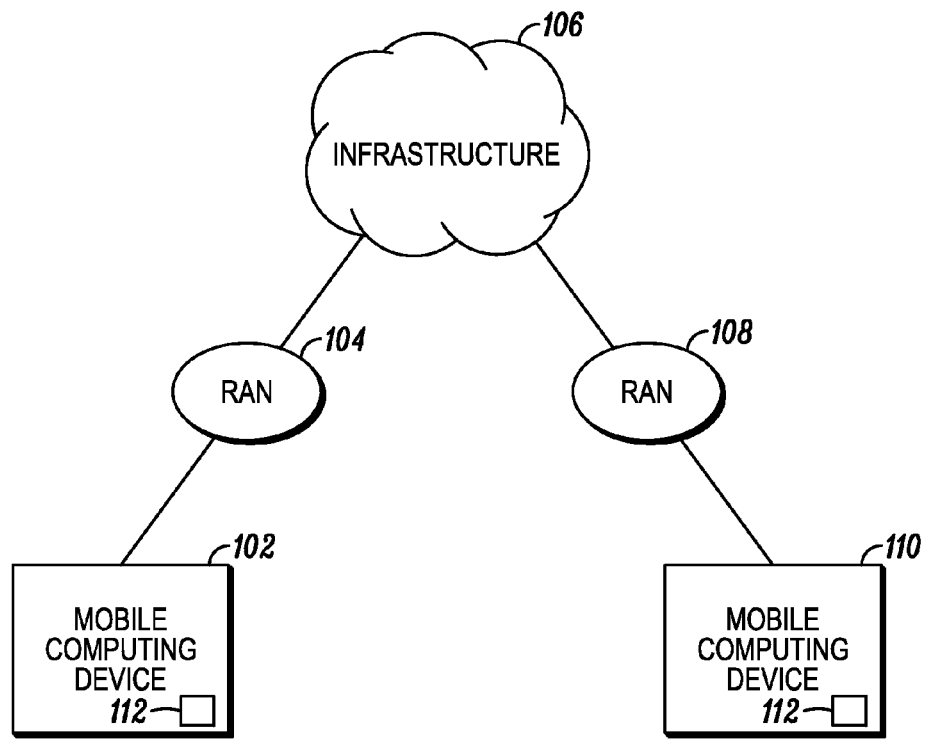
FIG. 1 is a block diagram of a system for improving the battery life of a mobile computing device according to the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method is described that controls the length of the synchronization interval associated with a mobile computing device (or mobile station, wireless communication device, wireless computing device, mobile or wireless station, cellphone, radio, laptop and the like, such terms used interchangeably herein) running an application in periodic or synchronous communication with an application server, in order to conserve and improve the life of an energy storage device in connection with a mobile computing device. The approaches described herein allow a mobile computing device to operate in a variety of conditions and provide a variety of bandwidth intensive services without substantially compromising the energy storage device in association with the mobile station.

Controlling the synchronization interval of the periodic or synchronous communication between the mobile computing device and application server may be made in a variety of different ways. In one example, the length of the synchronization interval for a lower priority application may be controlled depending on the energy drain measurement while synchronizing a higher priority application. In another example the length of the synchronization interval for a lower priority application may be dynamically decreased, and in another example, the length may be dynamically increased, depending on the energy drain measurement while synchronizing a higher priority application, as detailed below.

Further adjustments may also be made. For instance, if the synchronization interval has been shortened, the length may be returned to its original length, at the next communication cycle, after the expiration of a period of time or by an over ride, again as detailed below.

Thus, approaches are described whereby the power storage device of the mobile computing device is improved even under less than ideal operating conditions and different modes of operation. Consequently, the mobile computing device can operate under a variety of operating conditions.

Referring now to FIG. 1, one example of a system for increasing the battery life of a mobile computing device is described. The system includes a first mobile computing device 102 that is coupled to a first Radio Access Network (RAN) 104. The first RAN 104 is coupled to a communication infrastructure 106. The infrastructure can include a plurality of application servers, for running various applications, as detailed below. A second mobile computing device 110 is coupled to a second RAN 108. The second RAN 108 is also coupled to the infrastructure 106. The principles described herein may be applied to a variety of wide area network systems, such as long-term evolution (LTE), ultra mobile wideband (UMB), 802.16e & m, High Rate Packet Data (HRPD) systems, or systems such as the Universal Mobile Telecommunication System (UMTS), as well as wireless local area networks, personal area networks, and wired networks.

The mobile computing devices 102 and 110 may be any type of mobile wireless device. The mobile computing devices 102 and 110 each include an energy detector 112 for detecting the energy expended in the mobile computing devices 102 and 110, as detailed below. For example, the mobile computing devices 102 and 110 may be cellular telephones, pagers, radios, mobile stations, personal computers, or personal digital assistants. As should be understood by those skilled in the art, other examples of mobile computing devices are possible.

The RANs 104 and 108 may be any device or combination of devices that allow the mobile computing devices 102 and 110 to have access to the communication infrastructure 106. For example, the RANs 104 and 108 may include access points, base stations, base station controllers, antennas, and other types of devices that facilitate these communications.

The communication infrastructure 106 preferably includes devices and/or networks that allow communications to be made between mobile stations. For example, the infrastructure 106 may include switches, servers, storage devices, and networks (e.g., wireless networks, the Internet, landline telephone networks) that facilitate communications between the mobile computing devices 102 and 110.

Figure 2:
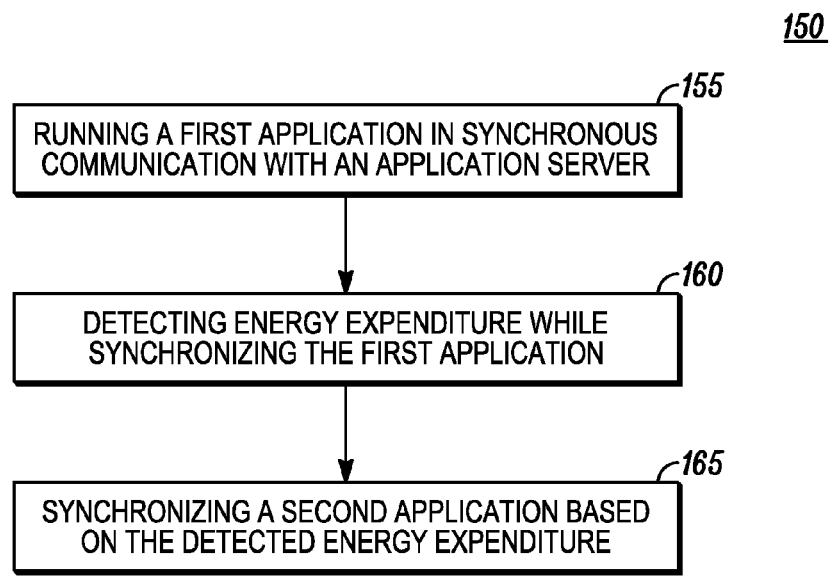
FIG. 2 is a flowchart of one example of an approach for improving the battery life of a mobile computing device according to the present invention.

Referring now to FIG. 2, one example of an approach for extending the useful life of an energy storage device of a mobile computing device is described. In one embodiment, a method 150 for extending the battery life of a mobile computing device, can include the steps of: running 155 a first application in synchronous communication with a first application server, detecting 160 energy expenditure while communicating with, for example, an application server for the first application, and synchronizing 165 communication for a subsequent application based on the detected energy expenditure, by: continuing to communicate with an application server if the detected energy expenditure is below a threshold, and discontinuing communication if the detected energy expenditure is above a threshold. Advantageously, this method can provide substantial energy savings in an energy storage device in mobile computing device applications, by continuing to communicate for the second application when energy expenditure is low and refraining from continuing to communicate or postponing communicating for the second application when energy expenditure is high.

In a preferred embodiment, the running step 155 includes running a priority application, and the synchronizing step 165 includes substantially immediately communicating for a subsequent application which is a lower priority application, when the detected energy expenditure is low, or refraining from communicating for the subsequent application when the detected energy expenditure is high.

This can improve performance and a user's experience, by providing communication between a mobile computing device and application server for lower priority applications when network conditions are favorable, as determined by power drain measurements while providing communications between the mobile computing device and an application server for higher priority applications. Advantageously, these features allow the mobile computing device to upload application data to a server, when network conditions or other energy determining factors are favorable. For example, the first application could be a social network application such as face-book or twitter and the second could be a data back-up application. The social network applications, which include real-time communication of personal messages, status and other personal data, is the higher priority application requiring periodic or synchronous server communications with a period or a synchronization interval on the order of 10 minutes. The data back-up application is the lower priority application requiring a synchronization interval on the order of 12 hours. In this example, over the course of 12 hours while the social network application synchronizes on the order of 72 times the network conditions may vary significantly. For example, the wide area network RF power level may vary due to variation in path-loss between the mobile device and the network base-station, or due to network traffic, or due to moving to a network with different capabilities, such as to a different wide area network, or a local area network. Thus the data back-up synchronization occurs at the more opportune times from the standpoint of power drain, as communication network conditions and other power determining conditions vary.

In more detail, the running step 155 can include synchronous communication including at least one of uploading application data from a mobile computing device to an application server and downloading application data to the mobile computing device from an application server.

In more detail, the first application can include at least one of email, instant messaging, and social networking and the subsequent application can include these, as well as, photo uploading, and data back-up, for example.

The method 150 can further include the step of completing the running of the first application even if the detected energy expenditure is above the threshold. Advantageously, this feature at least completes a users desired application. For example, a lower priority application may have a nominal synchronization interval associated with it, which is longer than the synchronization interval for the higher priority application, and the synchronizing 165 step may include continuing to communicate for the lower priority application on a nominal synchronization interval even if the detected energy expenditure is above the threshold. In this way the server communication for the lower priority application may be advanced in time if energy expenditure is low, but is not delayed beyond the nominal synchronization interval time.

The continuing step can include substantially immediately starting communication with the first application server for the subsequent application, if both the first and second application run on the same application server. In this way the communication will continue for the second application without stopping and restarting, or otherwise interrupting, which can cause unnecessary energy expenditure. Alternately, the continuing step can include substantially immediately starting communication with a second application server for the second application. In this way the communication will commence for the second application immediately after the ending of communication for the first application, without delays or interruptions which can cause unnecessary energy expenditure. Furthermore, in this way the second application communication is likely to begin with similar network conditions as with the first application communications, which may correspond to low energy expenditure, as detected with respect to step 160.

The detecting step 160 can include at least one of measuring a device current, a battery current, device power consumption, a battery power output, a device energy consumption, and a battery energy output, a device current per communication bit, a battery current per communication bit, device power consumption per communication bit, a battery power output per communication bit, a device energy consumption per communication bit, and a battery energy output per communication bit. These detecting and measuring steps are collectively referred to as detecting energy expenditure herein.

For example, the detecting 160 step may include measurement of current drain in a radio frequency transceiver device which varies, for example, with data modulation method or RF power level which varies according to network conditions. Alternatively, instead of a current drain measurement, power may be measured, which is a measure of voltage times current. Alternatively, instead of current or power measurements, energy may be measured, which is a measure of current or power times time. Alternatively the current, power, or energy may be measured in a component of the transceiver, such as the RF power amplifier, or in the entire computing device, which may include the transceiver and an application controller, user interface, etc. Alternatively the current, power or energy may be measured at the output of an energy storage device such as a battery. Alternatively, the current, power or energy may be scaled by the amount of data communicated or the communication data rate, which also varies with network conditions, thereby providing, for example, a measure of current, power or energy per communication bit, byte, or word, etc.

In one embodiment, the method 150 can include the running 155 step including providing a mobile computing device in synchronous application server communication for the first application on a first synchronous communication interval, and in synchronous application server communication for the subsequent application on a second nominal synchronous communication interval equal to the first synchronous communication interval times a nominal integer number, and the synchronizing step 165 includes reducing the second synchronous communication interval to the first synchronization interval, times an integer number less than the nominal integer number. In this way the server communication for the second application is completed while energy expenditure is low.

In another embodiment, the method 150 can include the running 155 step including providing a mobile computing device in synchronous application server communication for the first application on a first synchronous communication interval, and in synchronous application server communication for the subsequent application on a second nominal synchronous communication interval equal to the first synchronous communication interval times a nominal integer number, and an ending step includes increasing the second synchronous communication interval to the first synchronization interval times an integer number greater than the nominal integer number. In this way the server communication for the second application is postponed while energy expenditure is high.

In more detail, the running step 155 can include synchronous communication including at least one of uploading application data from a mobile computing device to an application server and downloading application data to the mobile computing device from an application server.

In one embodiment, the method 150 can include providing a programmable mode that allows the user to program preferential first applications, and subsequent second, third and so forth applications. For example, each application may have a pre-assigned priority number or value, and upon starting the application the priority number or value is compared with priority numbers for the other running applications, and the application with the highest priority number is the preferential first application. Alternatively, when an application is started, an associated nominal synchronization interval may be compared against the nominal synchronization interval for other running applications, and the application having the shortest nominal synchronization interval may be the preferred first application(s).

The term application, as used herein, can include at least one of email, instant messaging, social networking, news feeding, gaming, media uploading (e.g. photo uploading), media downloading (e.g. music downloading), and data backup, or any other application requiring data synchronization or otherwise having regular communication with an application server.

Figure 3:
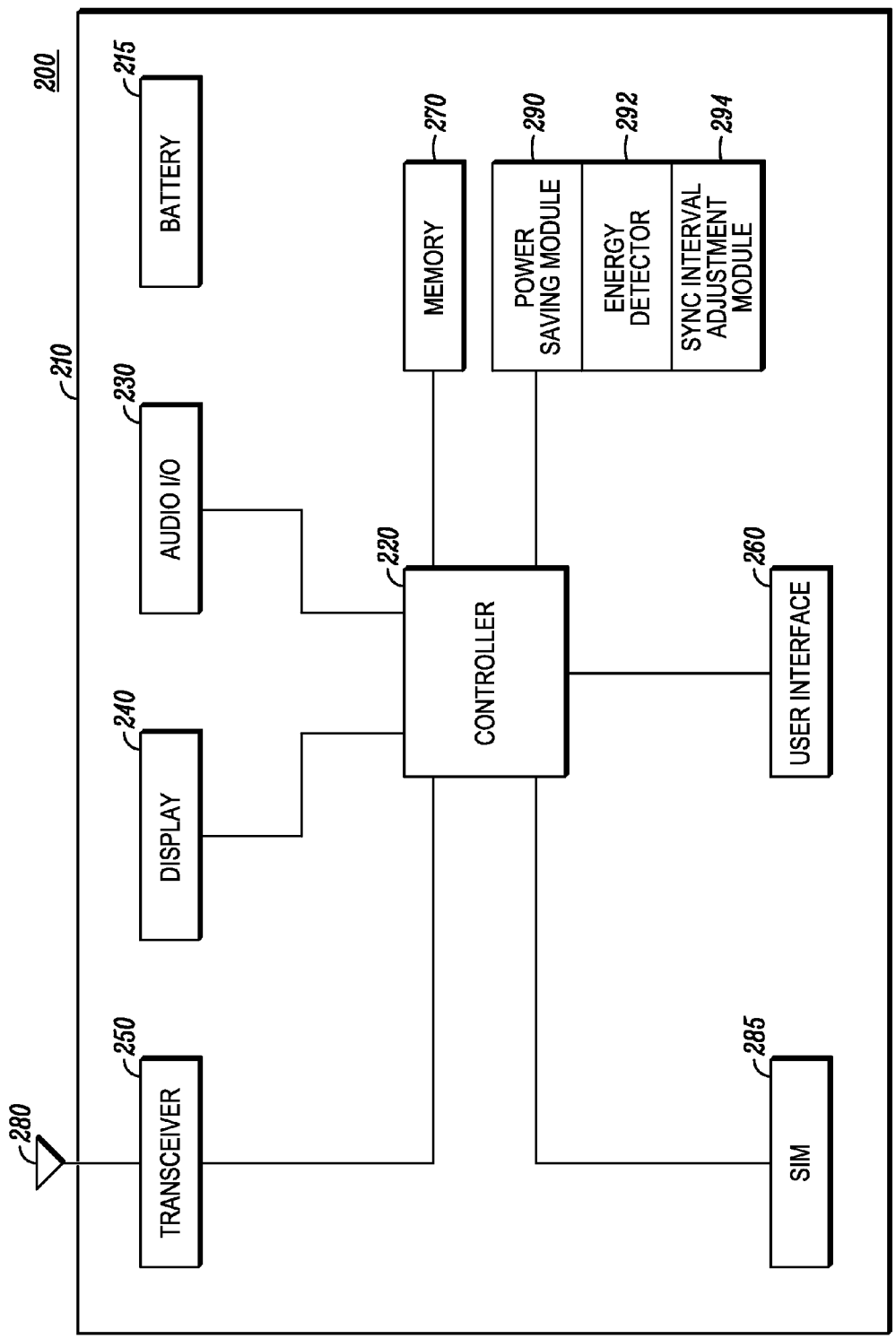
FIG. 3 is a block diagram of a mobile computing device that provides for an improved battery life according to the present invention.

Referring now to FIG. 3, there is shown an exemplary block diagram of a mobile computing device 200, such as the mobile computing devices 102 or 110, according to one embodiment. The mobile computing device 200 can include a housing 210, an energy storage device 215, a controller 220 coupled to the housing 210, audio input and output circuitry 230 coupled to the housing 210, a display 240 coupled to the housing 210, one or more transceivers 250 coupled to the housing 210, a user interface 260 coupled to the housing 210, a memory 270 coupled to the housing 210, an antenna 280 coupled to the housing 210, and a removable subscriber identity module (SIM) 285 coupled to the controller 220. The mobile computing device 200 further includes a power saving module 290, an energy detector 292, and a synchronization interval adjustment module 294, which are coupled to the controller 220. In more detail, they can reside within the controller 220, can reside within the memory 270, can be autonomous modules, can be software, can be hardware, or can be in any other format useful for a module on a wireless communication device 200. The energy detector may detect current, voltage, power, or energy consumption of the computing device 210, or of components therein such as the transceiver 250, or current, voltage, power or energy output of an energy storage device such as battery 215.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory or any other memory that can be coupled to a wireless communication device.

In more detail, in one embodiment, the mobile computing device 200 with an energy storage device in FIG. 3, includes: a housing 210; a controller 220 coupled to the housing 210, the controller 220 configured to run at least a first application in synchronous communication with a first application server, and a second application in synchronous communication with one of the first application server and a second application server; memory 270 coupled to the controller 220; a wireless transceiver 250 coupled to the controller 220 for synchronizing application data between the mobile computing device 200 and at least the first application server (which could reside in infrastructure 106 in FIG. 1); an energy detector 292 configured to detect energy expended by the mobile computing device while communicating with or synchronizing with the first application (which may be scaled by an amount of communicated data or data rate as determined by operation of the transceiver 250); and a power saving module 290 configured to control communication with a subsequent or second application, or synchronize the second application, based on the detected energy expenditure, by: continuing to synchronize with the second application if the detected energy expenditure is below a threshold, and discontinuing communication if the detected energy expenditure is above a threshold.

Advantageously, the power saving module 290 and synchronization interval adjustment module 294, can allow the mobile computing device 200 to dynamically manage energy expenditures such as the energy consumption of the device 200 or module therein such as transceiver 250, or the energy output of a power storage device 215, such as a battery, a fuel cell or electrochemical capacitor. This arrangement can provide a longer useful life for mobile computing device before having to recharge a user's power storage device 215. This can be accomplished by uploading or downloading of application data when energy expenditure is low, and refraining from uploading or downloading of application data when energy expenditure is high.

In one arrangement, the synchronization interval adjustment module 294 is configured to shorten a nominal synchronization interval between the mobile computing device and the application server when the energy expenditure is low or below a threshold. Likewise, the synchronization interval adjustment module 294 can be configured to increase a nominal synchronization interval when energy expenditure is high or above a threshold.

In another embodiment, the power savings module 290 is configured to trigger synchronization of a lower priority application when the priority level, value or number exceeds a threshold which is based on the measured energy expenditure from the energy detector 292. In this embodiment the priority level, value or number associated with the lower priority application may dynamically change with the application state, and more specifically with the amount of time which has elapsed since the last synchronization. Thus, a dynamic prioritization associated with the application may circumvent the need for providing a nominal synchronization interval associated with the application.

In one embodiment, the synchronization interval adjustment module 294 is configured to return to a previous or default synchronization interval setting or prioritization value based on at least one of: a default setting, a user controlled setting, an application server controlled setting, an application state, a present time, a present day, a present date, a state of a clock, and a state of a calendar, as detailed herein.

In more detail, the synchronization interval adjustment module 294 is configured to provide a synchronization mode having: a dormant mode including a longer synchronization interval when it is unlikely that a higher application performance is needed by a user; and an active mode including a shorter synchronization interval when the motion detector 292 indicates that it is likely that higher application performance is needed by a user. Alternatively the dormant mode includes a lower synchronization priority value and the active mode including a higher synchronization priority value. In either mode the synchronization priority value may increase with the amount of elapsed time since the last synchronization.

Advantageously, this feature provides a useful compromise for energy conservation of the power storage device on one hand, while also accommodating a user's demand for a short synchronization interval when desired, on the other.

In one embodiment, the instant invention is incorporated into the communication infrastructure and in another it can be incorporated into a wireless communication device. More specifically, the power saving module 290 and the sync interval adjustment module 294 may be incorporated into the mobile device 200 or alternatively into the infrastructure 106. Other placements are possible, such as including being in both.

Thus, approaches are described whereby the energy storage device of a mobile station is improved regardless of the operating environment or mode of the mobile station. Consequently, the mobile computing device can operate in a variety of operating conditions and utilize power-consuming services, while maintaining and improving the lifetime of an energy storage device of the mobile computing device. Because of the method, structure and disclosed approaches detailed herein, the user experience can be significantly enhanced.

Figure 4:
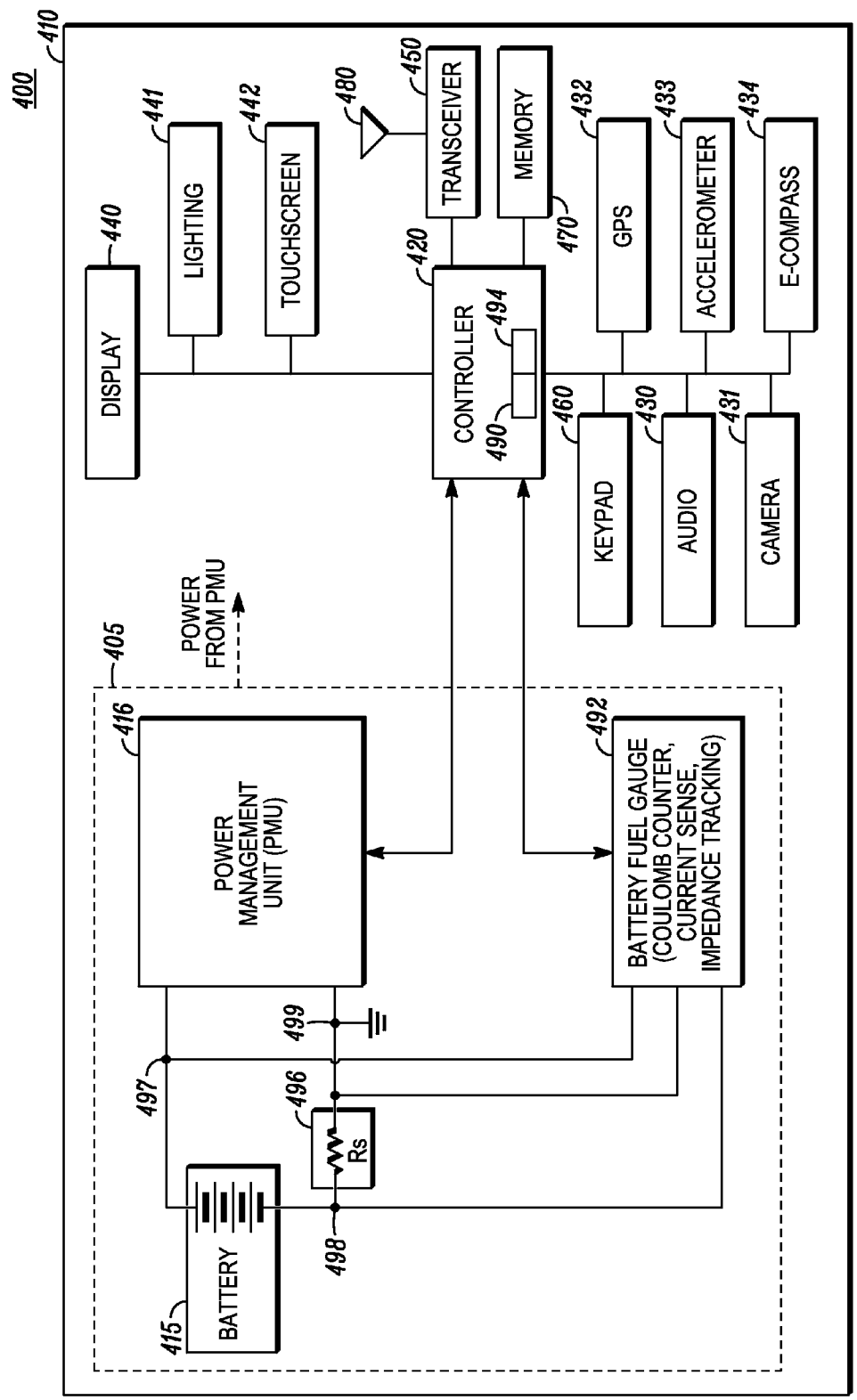
FIG. 4 is a schematic diagram an energy expenditure detecting device in a mobile computing device that provides for an improved battery life according to the present invention.

Referring now to FIG. 4, there is shown a second exemplary block diagram of a mobile computing device 400, such as the mobile computing devices 102 or 110. The mobile computing device 400 can include a housing 410, a controller 420 coupled to the housing 410, audio input and output circuitry 430 coupled to the housing 410, a camera 431 coupled to the housing 410, a global positioning satellite (GPS) receiver and antenna 432 coupled to the housing 410, an accelerometer 433 coupled to the housing 410, and an electric compass (e-compass) 434 coupled to the housing 410, a display 440, lighting 441, and touch screen user interface 442 coupled to the housing 410, one or more transceivers 450 and one or more antennas 480 coupled to the housing 410, a keypad user interface 460 coupled to the housing 410, and a memory 470 coupled to the housing 410. The mobile computing device 400 further includes: a power saving module 490 and a synchronization interval adjustment module 494 which can reside within controller 420.

The mobile computing device 400 in FIG. 4, further includes an energy subsystem 405 (shown in phantom), coupled to the housing 410. The energy subsystem 405 can comprise a battery 415, having a positive circuit node 497 and negative circuit node 498. The energy subsystem 405 in FIG. 4 shows a current sampling resistor, Rs, 496 connected between the negative battery circuit node 498 and an electrical ground node 499. The energy subsystem 405 shows a power management unit (PMU) 416 which converts battery power in the form of a voltage potential between the battery positive node 497 and the ground node 499, and outputs power to the electrical circuits in device 400. The energy subsystem can further include a battery fuel gauge system 492, which provides current sensing, coulomb counting and battery impedance tracking functions. In more detail, battery fuel gauge system 492 can detect current or power by monitoring voltage across Rs 496, it can determine current by dividing the detected voltage by resistance Rs, it can determine power by multiplying current by battery voltage at node 497, and it can determine energy expenditure by integrating current or power over time. In this way battery fuel gauge system 492 can serve as an energy expenditure detector, for detecting energy expended from the energy system 405, the energy storage device or battery 415, or for energy expended into the mobile computing device 400, or one or more of the circuits employed therein such as the transceiver 450.

The display 440 in FIG. 4 can be a liquid crystal display (LCD), a light emitting diode (LED) display, a plasma display, or any other means for displaying information. The transceiver 450 may include a transmitter and/or a receiver. The audio input and output circuitry 430 can include a microphone, a speaker, a transducer, or any other audio input and output circuitry. The user interface 460 can include a keypad, buttons, a touch pad, a joystick, an additional display, or any other device useful for providing an interface between a user and an electronic device. The memory 470 may include a random access memory, a read only memory, an optical memory or any other memory that can be coupled to a wireless communication device.

In yet more detail, and in one embodiment, the mobile computing device 400 configured with an energy storage device in FIG. 4, includes: a housing 410; a controller 420 coupled to the housing 410, the controller 420 configured to run at least a first application in synchronous communication with a first application server, and a second application in synchronous communication with at least one of the first application server and a second application server; memory 470 coupled to the controller 420; one or more wireless transceivers 450 coupled to the controller 420 for synchronizing application data between the mobile computing device 400 and at least the first application server (which could reside in infrastructure 106 in FIG. 1); battery fuel gauge 492 configured to detect energy expended by the mobile computing device while communicating with an application server, or synchronizing, for the first application, which may be scaled by an amount of communicated data or data rate as determined by operation of the transceiver 450; and a power saving module 490 and synchronization interval controller 494, which can reside in the controller 420, configured to control communication for a subsequent application, or synchronize the second application, based on the detected energy expenditure, by: continuing to communicate with, or synchronizing, the second application if the detected energy expenditure is below a threshold, and discontinuing communication if the detected energy expenditure is above a threshold.

Advantageously, the power saving module 490 and synchronization interval adjustment module 494 can allow the mobile computing device 400 to dynamically manage energy expenditures, such as the energy consumption of the device 400 or module therein such as transceiver 450, or the energy output of a power storage device 415, such as a battery, a fuel cell or electrochemical capacitor. This arrangement can provide a longer useful life for a mobile computing device before having to recharge a user's power storage device 415, by uploading or downloading of application data when energy expenditure is low, and refraining from uploading or downloading of application data when energy expenditure is high.

In one arrangement, the synchronization interval adjustment module 494 is configured to shorten a nominal synchronization interval between the mobile computing device and the application server, when the energy expenditure is low or below a threshold. Likewise, the synchronization interval adjustment module 494 can be configured to increase a nominal synchronization interval when energy expenditure is high or above a threshold.

In another embodiment, the power savings module 490 is configured to trigger synchronization of a lower priority application when the priority level, value or number exceeds a threshold which is based on the measured energy expenditure from the battery fuel gauge 492. In this embodiment the priority level, value or number associated with the lower priority application may dynamically change with the application state, and more specifically with the amount of time which has elapsed since the last synchronization. Thus, a dynamic prioritization associated with the application may circumvent the need for providing a nominal synchronization interval associated with the application.

In one embodiment, the synchronization interval adjustment module 494 is configured to return to a previous or default synchronization interval setting or prioritization value based on at least one of: a default setting, a user controlled setting, an application server controlled setting, an application state, a present time, a present day, a present date, a state of a clock, and a state of a calendar.

In more detail, in one arrangement, the synchronization interval adjustment module 494 is configured to provide a synchronization mode having: a dormant mode including a longer synchronization interval when it is unlikely that a higher application performance is needed by a user; and an active mode including a shorter synchronization interval when the motion detector 492 indicates that it is likely that higher application performance is needed by a user. Alternatively the dormant mode includes a lower synchronization priority value and the active mode including a higher synchronization priority value. In either mode the synchronization priority value may increase with the amount of elapsed time since the last synchronization. Advantageously, this feature provides a useful compromise for energy conservation of the power storage device (battery) on one hand, while also accommodating a user's demand for a short synchronization interval when desired, on the other.

In one embodiment, the instant invention is incorporated into the communication infrastructure and in another it can be incorporated into a wireless communication device. Other placements are possible, such as including being in both.

Thus, approaches are described whereby the energy storage device of a mobile station is improved regardless of the operating environment or mode of the mobile station. Consequently, the mobile computing device can operate in a variety of operating conditions and utilize power-consuming services, while maintaining and improving the lifetime of an energy storage device or battery of the mobile computing device. Because of the method, structure and disclosed approaches detailed herein, the user experience can be significantly enhanced.

Figure 5:
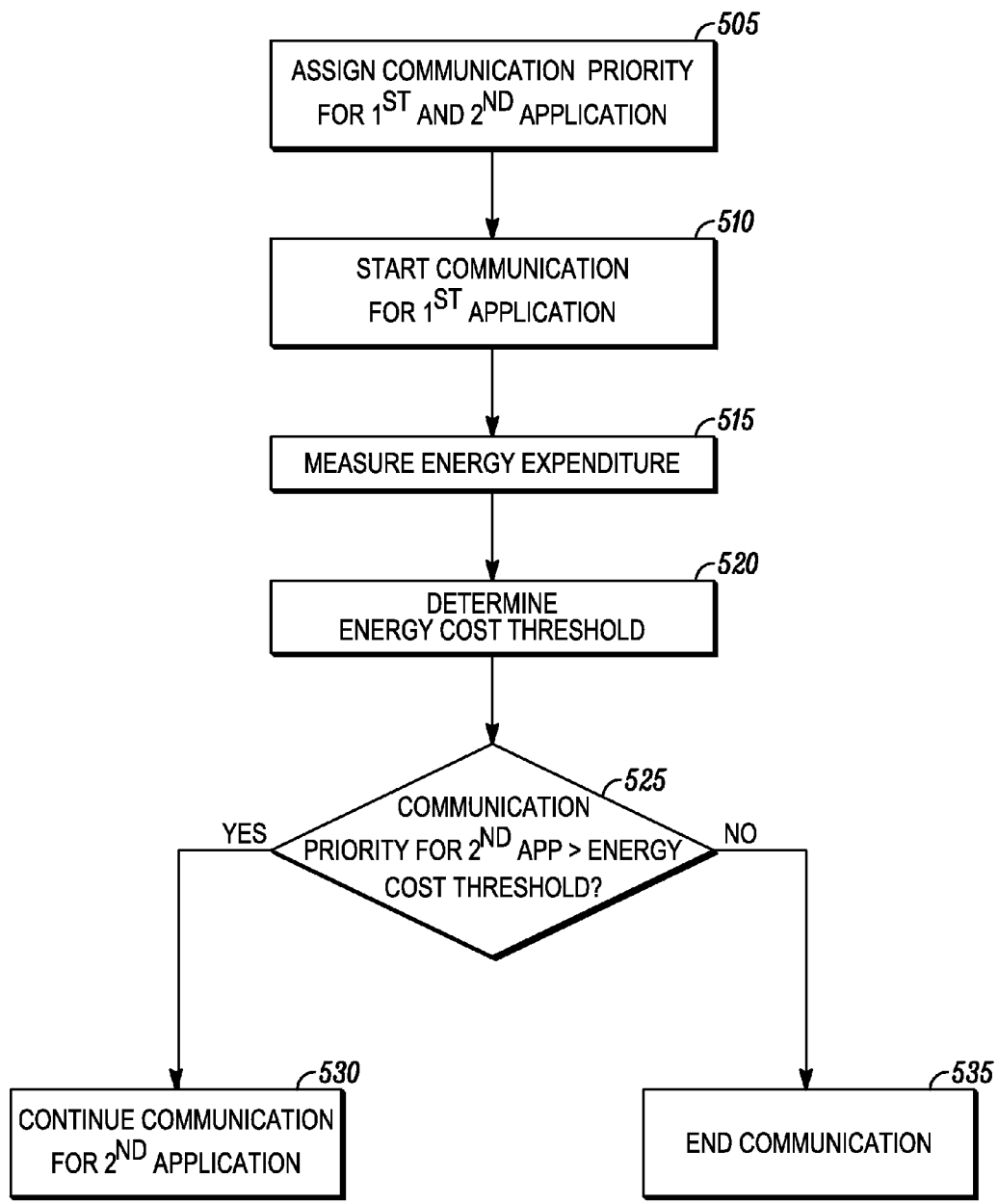
FIG. 5 is a first flow diagram of a mobile computing device running an application in synchronous communication with an application server according to the present invention.

Turning to FIG. 5, there is shown an alternative simplified flow diagram 500, according to one embodiment. In more detail, a method 500 for lengthening the battery life of a mobile computing device running at least a first and second application in synchronous communication with one or more application servers, is shown. It can include the steps of: assigning 505 a communication priority for at least one of a first and a second application, starting 510 communication for the first application, measuring 515 an energy expenditure concurrent with the started communication, determining 520 an energy cost threshold based on the measured expenditure, comparing 525 the communication priority and the energy cost threshold, continuing 530 communicating for the second application if the assigned communication priority for the second application exceeds the determined energy cost threshold (shown as Yes path from decision diamond 525), and ending 535 communicating if the assigned communication priority for the second application is less than the determined energy cost threshold (shown as No path from decision diamond 525). In this way the communication for the lower priority second application only occurs if the energy expenditure is lower than the communication priority setting for that application.

In one exemplary embodiment, the first application is a higher priority application and the second application is a lower priority application. For example, the first may be an email program, having a synchronization interval on the order of 5 minutes and the second may be a picture uploading application for which the user may set a priority value resulting in nominal synchronization interval of 2 hours for conditions in which energy expenditure is high, but which will have a shorter synchronization interval when network conditions allow lower energy expenditure.

The starting step 510 can include starting communication for the first application, i.e. synchronizing the first application, on a first application synchronization interval based on at least one of: a default setting, a user controlled setting, an application server controlled setting, an application state, a present time, a present day, a present date, a state of a clock, and a state of a calendar. In this way the nominal synchronization interval can be controlled according to the application state such that, for example, when the application is dormant or is likely to be dormant, the synchronization interval is longer, and when the application active, or is likely to be active, the synchronization interval is shorter.

In one embodiment, the assigning step 505 includes prioritizing based on a time elapsed since a previous communication for the second application. Thus there may not be a nominal synchronization interval setting per se, but instead there may be an effective nominal synchronization interval based on how quickly the priority value changes with elapsed time.

In more detail, the method 500 can further include running at least a first and second application in synchronous communication with one or more application servers, the synchronous communication includes uploading application data from a mobile computing device to an application server and downloading application data to a mobile computing device from the application server. For example, the first and second applications may include at least one of email, instant messaging, gaming, photo uploading and data back-up, and social networking which includes uploading and downloading of personal status e.g. location, presence, availability, activity, health, mood, etc.

Figure 6:
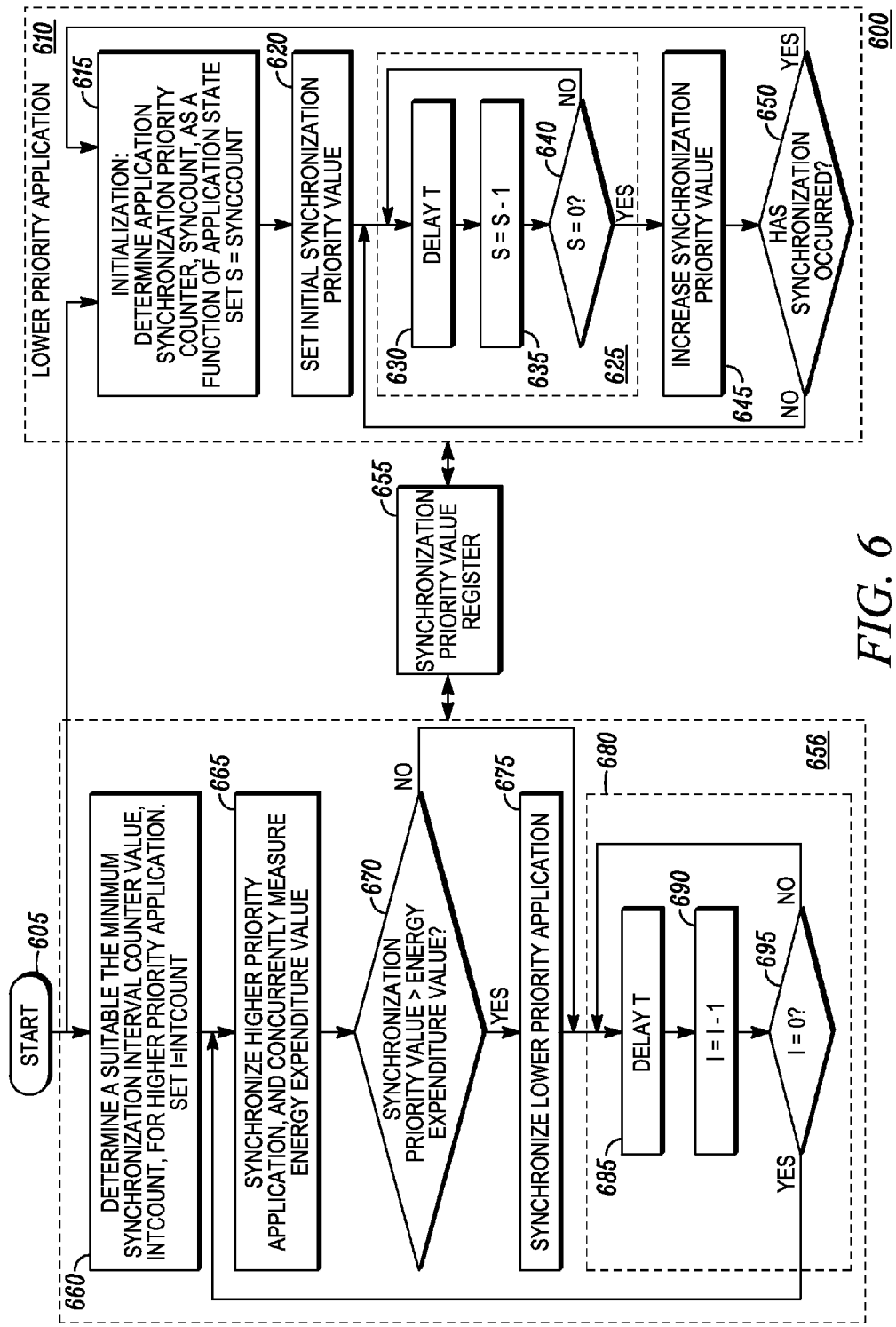
FIG. 6 is a second flow diagram of a power saving module according to the present invention.

Referring to FIG. 6, there is shown an alternative exemplary flow diagram 600, according to an embodiment for lengthening the battery life of a mobile computing device, running at least a first and second application in synchronous communication with one or more application servers. The method starts at node 605. A concurrently running lower priority application 610 begins with initialization 615 comprising the steps: Determining Application Synchronization Priority Counter, SyncCount, as a function of Application State, and setting register S=SyncCount. The application continues with Setting 620 of an initial Synchronization Priority value into Synchronization Priority Value register 655. The application continues with a delay timer 625, comprising delay T 630, decrementing the value of register S 635, and determining if S=0 640. If at 640 it is determined that S=0 or Yes, then the delay S*T is completed and the process returns to initialization 615. If at 640 it is determined that S≠0 or No, then the delay is not complete and the process returns to delay T 630. In this way the lower priority application provides a synchronization priority value to the synchronization priority register 655 which increases with each completion of delay timer 625, thereby increasing the priority for data exchange with the application server, until synchronization occurs and the application priority is reset 620 to the initial value. Register 655 may be a discrete register or memory, or a part of memory 270, or integrated in one of the modules such as controller 220, SIM 285, power saving module 290, or sync interval adjustment module 294 in FIG. 3.

Continuing with method 600, the synchronization interval controller 656 runs concurrently with application 610. It begins with initialization 660, which includes the steps: Determining a suitable minimum synchronization interval counter value, IntCount, for higher priority application; and setting register I=IntCount. The process continues to the steps synchronizing and measuring 665 steps in which application server communication is started for the higher priority application, and the energy expenditure is measured. The process further continues with determining whether the synchronization priority (as determined from register 655) is greater than the energy expenditure value 670. If the synchronization priority value is greater than the energy expenditure value or Yes, then the process continues to synchronize 675 the lower priority application, followed by delay timer 680. If the synchronization priority value is not greater than the energy expenditure value, or No in FIG. 6, then the process skips directly to delay timer 680, comprising delay T 685, decrementing the value of register I 690, and determining if I=0 695. If I=0 (Yes in decision diamond 695), then the delay I*T is completed and the process returns to the synchronizing and measuring step 665. If I≠0 (No in decision diamond 695), then the delay is not complete and the process returns to delay T 685. In this way the higher priority application exchanges data with the application server with synchronization interval I*T, and the lower priority application only synchronizes if the synchronization priority value exceeds the energy expenditure value. The nominal low priority synchronization interval is thus dependant on the synchronization priority value and its rate of increase, as well as the nominal energy expenditure value. The desired benefit is that the synchronization interval varies with energy expenditure, which may vary with network conditions.

Figure 7:
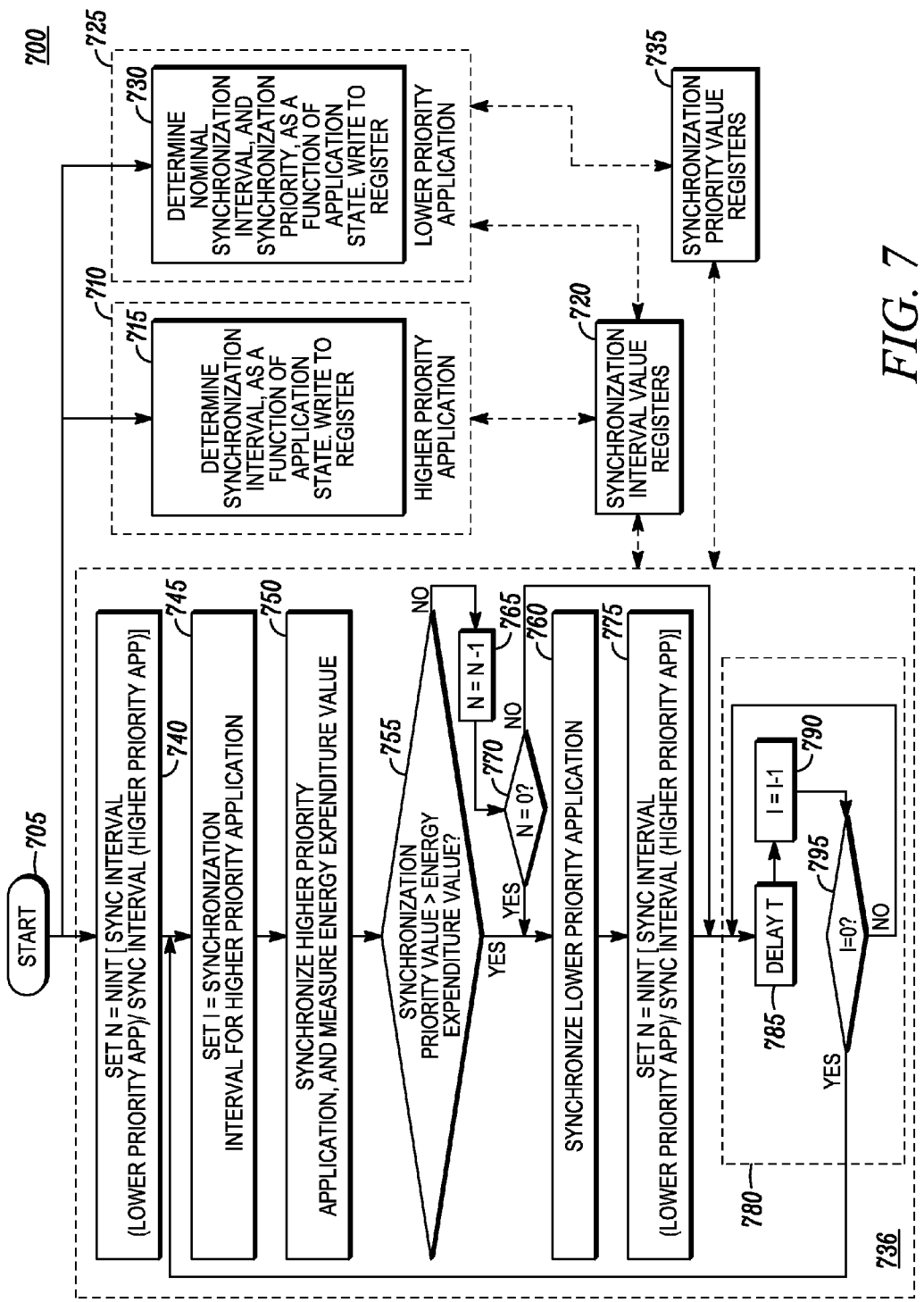
FIG. 7 is a third flow diagram of a power saving module according to the present invention.

Referring to FIG. 7, there is shown an alternative flow diagram 700, according to an embodiment for lengthening the battery life of a mobile computing device, running at least a first and second application in synchronous communication with one or more application servers. The method starts at the node 705. A higher priority application 710 runs concurrently, including the steps 715 of: determining the synchronization interval as a function of application state; and writing to synchronization interval register 720. A lower priority application 725 also runs concurrently, including the steps 730 of: determining the nominal synchronization interval as a function of application state; determining the synchronization priority as a function of application state; writing to synchronization interval register 720; and writing to the synchronization priority register 735. Thus the applications 710, 725 provide nominal synchronization interval values and nominal priority values as a function of application state, via registers 720 and 735, respectively. Thus, the synchronization interval and priority values can be set higher if the application is active or the user is more likely to require better application performance or responsiveness, or they can be set lower if the application is dormant, or the user is less likely to require higher application performance and responsiveness, thereby saving energy.

The process of controlling the synchronization interval 736 runs concurrently with the applications 710, 725, beginning with setting the N register 740 to the nearest integer of the ratio of lower priority nominal synchronization interval to the higher priority synchronization interval. In this way the lower priority synchronizations are contiguous in time to the higher priority synchronization thereby reducing unnecessary stopping and starting of the communication circuits which can waste energy. The process continues to the step of setting the I register 745 to the synchronization interval of the higher priority application, and then to the synchronizing and measuring 750 steps, in which the application server communication is started for the higher priority application, and the energy expenditure is measured. The process continues with determining 755 whether the synchronization priority (as determined from register 735) is greater than the energy expenditure value. If the synchronization priority value is greater than the energy expenditure value (or "Yes" in decision diamond 755), then the process continues to synchronizing the lower priority application 760, followed by resetting of the N register 775 to the nearest integer of the ratio of lower priority nominal synchronization interval to the higher priority synchronization interval, followed by starting timer 780. If at 755 the synchronization priority value is not greater than the energy expenditure value (or "No" in decision diamond 755), then the process goes to decrementing the N register 765, followed by determining if N=0 770. If at decision diamond 770 it is determined that N=0 or "Yes", then the nominal synchronization interval is completed for the lower priority application and the lower priority application is synchronized 760. If at decision diamond 770, it is determined that N≠0 or "No", then the process skips to timer 780 comprising delay T 785, decrementing the value of register I 790, and determining if I=0 795. If at decision diamond 795 it is determined that I=0 then the delay I*T is completed and the process returns to the synchronizing and measuring step 665. If at decision diamond 795 it is determined that I≠0 then the delay timer is not complete and the process returns to delay T 630. In this way the higher priority application exchanges data with the application server with synchronization interval I*T, and the lower priority application synchronizes if the synchronization priority value exceeds the energy expenditure value, or the synchronization interval I*N*T is completed. The maximum low priority synchronization interval is thus I*N*T which is approximately the nominal low priority synchronization interval from register 720 as determined by the application 725. Reducing the low priority synchronization interval will occur depending on the synchronization priority value and the expenditure value. Thus the desired benefit is achieved in that the synchronization interval varies with energy expenditure which varies with network conditions.

Figure 8:
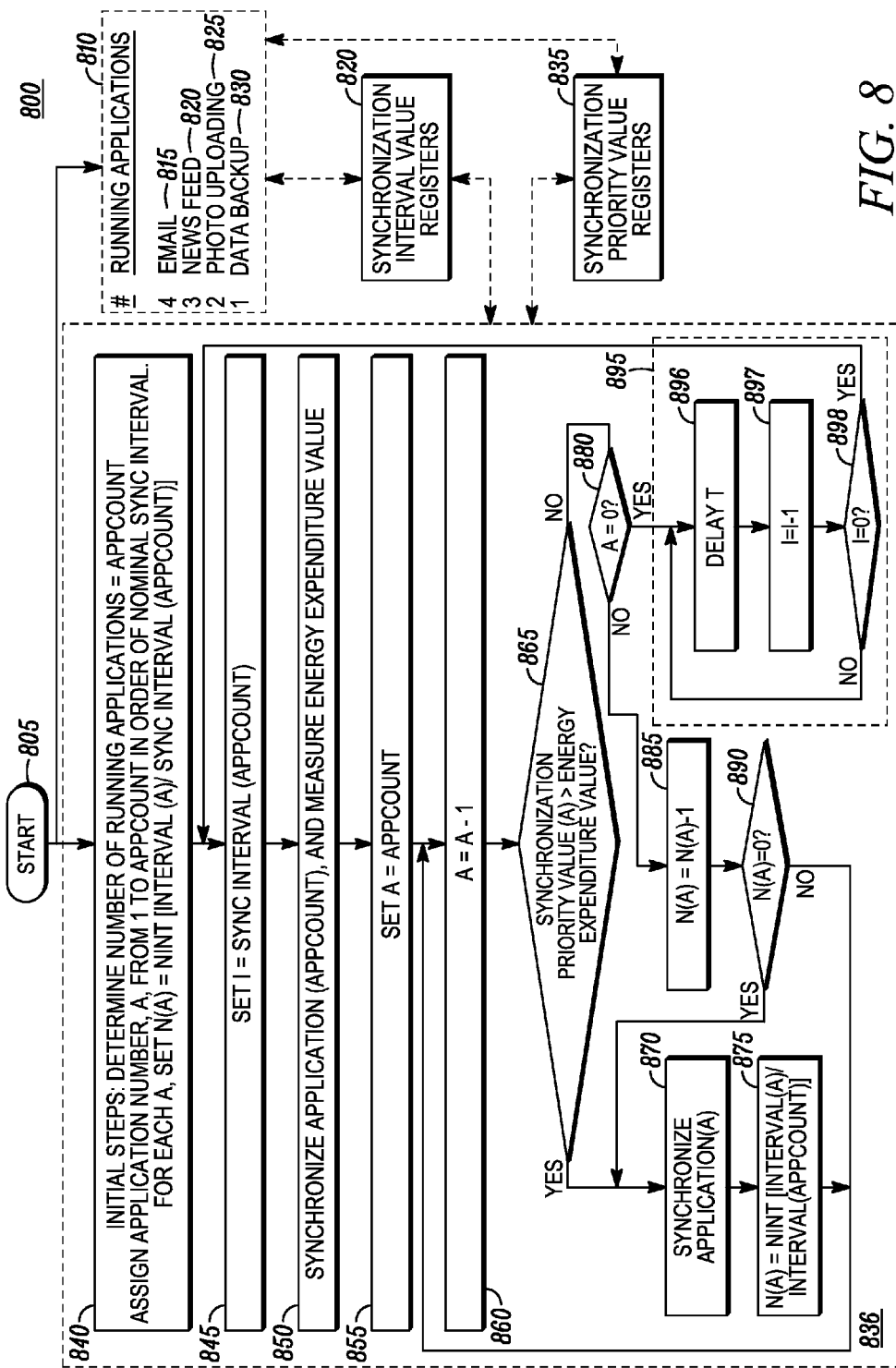
FIG. 8 is a fourth flow diagram of a power saving module according to the present invention.

Referring to FIG. 8, there is shown an alternative flow diagram 800, according to a detailed embodiment. The method starts at the node 805. Multiple applications 810 run concurrently, including an email application 815, a news feed application 820, a photo uploading application 825, and a data backup application 830. As in the previous example these applications provide nominal synchronization interval values via synchronization interval value register 820, and synchronization priority values via synchronization priority register 835. Each application may adjust its synchronization interval and priority values depending on application state, in order to improve performance and reduce power drain. Registers 820, 835 may be discrete registers or memories, or a part of memory 270, or integrated in one of the modules such as controller 220, SIM 285, power saving module 290.

The process of controlling the synchronization interval 836 runs concurrently with the applications 810, beginning with the initial step 840 of determining number of running applications=AppCount; for each application assigning application number, A, from 1 to AppCount in order of synchronization interval value, as determined by register 820; and for each A, setting N to the nearest integer of the ratio of lower priority nominal synchronization interval to the higher priority synchronization interval, i.e. N(A)=NINT [Interval (A)/Sync Interval (AppCount)].

The next steps involve setting the I register 845 to the synchronization interval of the highest priority application, and then synchronizing and measuring step in 850. In step 850 the application server communication is started for the highest priority application, and the energy expenditure is measured. The process continues with setting the A register to AppCount 855, decrementing the A register 860, and determining 865 whether the synchronization priority for application A (as determined from register 835) is greater than the energy expenditure value. If the synchronization priority value is greater than the energy expenditure value or "Yes", then the process continues to synchronize application A 870, followed by resetting of the N register 875 to the nearest integer of the ratio of lower priority nominal synchronization interval to the higher priority synchronization interval, and from there the process returns to the step of decrementing the A register 860. If at 865 the synchronization priority value is not greater than the energy expenditure value or "No", then the process goes to determining if A=0 880. If at step 880 it is determined that A≠0 the process continues to the step of decrementing the N(A) register 885, followed by determining if N(A)=0 890. If at 890 it is determined that N(A)=0 then the process goes to determining step 870. If at 890 it is determined that N(A)≠0 then the process goes to the step of decrementing A 860. If at 880 it is determined that A=0 the process continues to timer 895 comprising delay T 896, decrementing the value of register I 897, and determining if I=0 898. If at 898 it is determined that I=0 then the delay I*T is completed and the process returns to setting the I register 845. If at 898 it is determined that I≠0 then the delay timer is not complete and the process returns to delay T 630. In this way the higher priority application exchanges data with the application server with synchronization interval I*T, and the lower priority applications synchronize if the synchronization priority value exceeds the energy expenditure value, or the synchronization interval I*N(A)*T is completed. The maximum priority synchronization interval for application A is thus I*N(A)*T which is approximately the nominal priority synchronization interval from register 820 as determined by the applications 810. Reducing of the low priority synchronization interval will occur depending on the synchronization priority value and the expenditure value. Thus the desired benefit is achieved in that the synchronization interval varies with energy expenditure which varies with network conditions.

Those skilled in the art will recognize that a wide variety of modifications, alterations, and combinations can be made with respect to the above described embodiments without departing from the broad scope of the invention, and that such modifications, alterations, and combinations are to be viewed as being within the scope of the invention.

The invention claimed is:

1. A method for lengthening the battery life of a mobile computing device, comprising the steps of:
running a first application in a mobile computing device in synchronous communication with an application server,
running a second application in a mobile computing device in synchronous communication with a second application server,
detecting energy expenditure in real time, while synchronizing the first application, and
synchronizing a second application based on the detected energy expenditure, by: continuing to communicate if the detected energy expenditure is below a threshold, and discontinuing communication if the detected energy expenditure is above a threshold, wherein at least one of the first and the second application in the mobile computing device has an assigned communication priority which is based on at least a time elapsed since a previous communication for the second application.

2. The method of claim 1, wherein the synchronizing the first application step includes communicating with an application server for a priority application, and the continuing step includes substantially immediately communicating for a lower priority application.

3. The method of claim 2, wherein the continuing step includes substantially immediately starting communication with the second application server for the second application.

4. The method of claim 2, wherein the continuing step includes substantially immediately starting communication with the second application server for the second application.

5. The method of claim 1, wherein the detecting step includes at least one of measuring a device current, a battery current, a device power consumption, a battery power output, a device energy consumption, and a battery energy output, a device current per communication bit, a battery current per communication bit, device power consumption per communication bit, a battery power output per communication bit, a device energy consumption per communication bit, and a battery energy output per communication bit.

6. The method of claim 1, wherein the running step includes providing a mobile computing device in synchronous application server communication for the first application on a first synchronous communication interval, and in synchronous application server communication for the subsequent application on the second nominal synchronous communication interval equal to the first synchronous communication interval times a nominal integer number, and
the continuing step includes reducing the second synchronous communication interval to the first synchronization interval times an integer number less than the nominal integer number.

7. The method of claim 1, wherein the running step includes providing a mobile computing device in synchronous application server communication for the first application on a first synchronous communication interval, and in synchronous application server communication for a subsequent application on a second nominal synchronous communication interval equal to the first synchronous communication interval times a nominal integer number, and
the discontinuing step includes increasing the second synchronous communication interval to the first synchronization interval times an integer number greater than the nominal integer number.

8. The method of claim 1, wherein the running step includes synchronous communication including at least one of uploading application data from a mobile computing device to an application server and downloading application data to the mobile computing device from an application server.

9. The method of claim 1, wherein the first application includes at least one of email, social networking, photo uploading, news feed downloading, and data back-up.

10. The method of claim 1, further comprising completing the running of the first application even if the detected energy expenditure is above the threshold.

11. A method for lengthening the battery life of a mobile computing device running at least a first and second application in synchronous communication with one or more application servers, comprising the steps of:
assigning a communication priority for at least one of a first and a second application in a mobile computing device, wherein the assigned communication priority is based on at least a time elapsed since a previous communication for the second application,
starting communication for the first application,
measuring an energy expenditure in real time, concurrent with the started communication,
determining an energy cost threshold based on the measured expenditure,
continuing communicating for the second application if the assigned communication priority for the second application exceeds the determined energy cost threshold, and
ending communicating if the assigned communication priority for the second application is less than the determined energy cost threshold.

12. The method of claim 11, wherein the first application is a higher priority application and the second application is a lower priority application.

13. The method of claim 11, wherein the step of starting communication includes starting communication for the first application on a first application synchronization interval based on at least one of: a default setting, a user controlled setting, an application server controlled setting, an application state, a present time, a present day, a present date, a state of a clock, and a state of a calendar.

14. The method of claim 11, wherein the assigned communication priority is also based on at least one of: a default setting, a user controlled setting, an application server controlled setting, an application state, a present time, a present day, a present date, a state of a clock, and a state of a calendar.

15. The method of claim 11, wherein the step of ending includes increasing the synchronization interval above a nominal interval which is based on at least one of: a default setting, a user controlled setting, an application server controlled setting, an application state, a present time, a present day, a present date, a state of a clock, and a state of a calendar.

16. The method of claim 11 further comprising running at least a first and second application in synchronous communication with one or more application servers, the synchronous communication includes at least one of uploading application data from a mobile computing device to an application server and downloading application data to a mobile computing device from the application server.

17. The method of claim 11 wherein at least one of the first and second applications includes at least one of email, instant messaging, social networking, news feeding, gaming, media uploading, media downloading and data back-up.

18. A mobile computing device configured with an energy storage device, comprising:
a housing;
a controller coupled to the housing, the controller configured to run a first application in synchronous communication with a first application server, and a second application in synchronous communication with at least one of the first application server and a second application server;
memory coupled to the controller;
a wireless transceiver coupled to the controller for synchronizing application data between the mobile computing device and at least the first application server;
an energy expenditure detector configured to detect energy being expended in real time, by the mobile computing device while synchronizing the first application data; and
a power saving module configured to control communication for a second application based on the detected energy expenditure, by: continuing to synchronize for the second application if the detected energy expenditure is below a threshold, and discontinuing synchronization if the detected energy expenditure is above a threshold; wherein at least one of the first and the second application in the mobile computing device has an assigned communication priority which is based on at least a time elapsed since a previous communication for the second application.

19. The mobile computing device of claim 18 wherein the energy expenditure detector comprises at least one of a current detector, a power detector and an energy detector.

20. The mobile computing device of claim 18 wherein the energy expenditure detector is configured to detect energy expended in at least one of the energy storage device, the mobile computing device, and the wireless transceiver.

* * * * *